UNITED STATES PATENT OFFICE.

JOSEPH KINTZ, OF WEST MERIDEN, CONNECTICUT, ASSIGNOR TO HIMSELF AND P. J. CLARK, OF SAME PLACE.

IMPROVEMENT IN COLORING METALS.

Specification forming part of Letters Patent No. 139,319, dated May 27, 1873; application filed April 5, 1873.

*To all whom it may concern:*

Be it known that I, JOSEPH KINTZ, of West Meriden, in the county of New Haven and State of Connecticut, have invented a new and Improved Process of Coloring Metal, of which the following is a specification:

For coloring cast-iron and other metals a dark-brown color, I first black the iron, then coat it with a sizing substance, which I partially dry, and then put on pulverized black lead and brush it to produce a polish; then I coat the lead with lacquer, and, lastly, heat the iron, which produces the desired dark-brown color. The blacking is mainly to hold the size.

I use brown or black baking japan, such as is made by varnish manufacturers, for first blacking the iron.

Having thus described my invention, I claim as new and desire to secure by Letters Patent—

The process of coloring metal by sizing it, covering the size with pulverized black lead, polishing the lead, lacquering the polished lead surface, and heating the whole, all substantially as specified.

JOSEPH KINTZ.

Witnesses:
    ORVILLE H. PLATT,
    J. H. STEVENS.